US008683538B2

(12) United States Patent
Tucker

(10) Patent No.: US 8,683,538 B2
(45) Date of Patent: Mar. 25, 2014

(54) MULTI-ACCESS CONTENT SERVER WITH SECURITY MANAGEMENT FOR IPTV

(75) Inventor: Curtis Tucker, Lee's Summit, MO (US)

(73) Assignee: CenturyLink Intellectual Property LLC, Denver, CO (US)

( * ) Notice: Subject to any disclaimer, the term of this patent is extended or adjusted under 35 U.S.C. 154(b) by 993 days.

(21) Appl. No.: 11/607,686

(22) Filed: Nov. 30, 2006

(65) Prior Publication Data
US 2008/0134277 A1 Jun. 5, 2008

(51) Int. Cl.
 *H04N 7/173* (2011.01)
(52) U.S. Cl.
 USPC .............................. 725/113; 725/141; 725/153
(58) Field of Classification Search
 USPC ............................... 725/86, 87, 133, 141, 153
 See application file for complete search history.

(56) References Cited

U.S. PATENT DOCUMENTS

| | | | | |
|---|---|---|---|---|
| 6,414,725 | B1 * | 7/2002 | Clarin et al. ................... | 348/714 |
| 7,921,448 | B2 * | 4/2011 | Fickle et al. ..................... | 725/95 |
| 2002/0032905 | A1 * | 3/2002 | Sherr et al. ..................... | 725/38 |
| 2005/0200695 | A1 * | 9/2005 | Maeda ...................... | 348/14.02 |
| 2006/0130112 | A1 * | 6/2006 | Stewart et al. ................ | 725/115 |
| 2007/0180485 | A1 * | 8/2007 | Dua .............................. | 725/114 |
| 2007/0199025 | A1 * | 8/2007 | Angiolillo et al. .............. | 725/47 |
| 2007/0207804 | A1 * | 9/2007 | Sharma et al. ................. | 455/436 |
| 2008/0066095 | A1 * | 3/2008 | Reinoso .......................... | 725/28 |
| 2009/0019485 | A1 * | 1/2009 | Ellis et al. ....................... | 725/40 |
| 2012/0047166 | A1 * | 2/2012 | Katz et al. ..................... | 707/769 |

OTHER PUBLICATIONS

"Envivio Introduces the World's Most Advanced Encoding System for Mobile TV"; Envivio, Inc., Aug. 29, 2006; available online at URL <http://www.envivio.com/news/press_release.php?id=124>. (3 page).
"4Caster Mobile Software"; Envivio, Inc. (2006); retrieved from the Internet on Sep. 28, 2006 at URL:<http://www.envivio.com/products/mvsenc_4caster_ms.php>. (1 page) (original publication date unknown).

* cited by examiner

*Primary Examiner* — Nnenna Ekpo
(74) *Attorney, Agent, or Firm* — Swanson & Bratschun, L.L.C.

(57) ABSTRACT

A system and method for distributing content over multiple networks may include at least two encoders configured to encode the content in formats for play on devices having different formats. A metadata management unit may be configured to apply information associated with the content to the content in the form of metadata. A content management server may be in communication with the encoders and be configured to receive and store the content. A conditional access digital rights management server may be in communication with the content management server and be configured to authenticate a user. A middleware server may be in communication with the content management server and be configured to manage a program guide accessible to users to view and select content to play on a device. Devices of different formats may be configured to access the content management server and select content to play via the program guide.

18 Claims, 5 Drawing Sheets

MULTI-ACCESS CONTENT SERVER WITH SECURITY MANAGEMENT FOR IPTV

BACKGROUND OF THE INVENTION

Traditionally, radio, television, and movie screens have been the primary media of entertainment. Today, people are entertained by watching content, such as movies, on a variety of devices. A single person can watch a movie on a television, standard or high-density, portable DVD player, video iPod®, mobile telephone, computer, etc. Each of these devices use different formats due to having different number of lines per screen, different communications protocols, different storage technology, different compression schemes, and so forth.

To accommodate the different forms of media, service providers and equipment manufacturers have developed a variety of hardware and network configurations. FIG. 1 is an illustration of an exemplary basic video on-demand (VOD) network architecture 100. The architecture 100 includes a video on-demand server 102 and middleware server 104. The video on-demand server 102 and middleware server 104 communicate with a set top box 106 that interfaces with a television 108 and remote control 110 within a consumers household 112. Communications between the video on-demand server 102, middleware server 104, and set top box 106 may be performed over a wireline network 112. In operation, a consumer may view a program guide on the television 108. The program guide is generated by the middleware 104 and communicated to the set top box 106. If a consumer decides to change the channel or select a movie for play, the consumer uses the remote control 110 to interface with the set top box 106, which, in turn, communicates the request via the network 112 to the middleware server 104 as indicated by the dashed line 114. The middleware server 104, in turn, communicates the request to the video on-demand server 102. The video on-demand server accesses and communicates a video stream 116 via the network 112 to the set top box 106 for play on the television 108.

FIG. 2 is an illustration of an exemplary system 200 with a conventional configuration of a video on-demand server system 202. The video on-demand server system 202 generally includes a satellite dish 204 that is used to receive content from a content (e.g., video and/or audio) provider via a satellite link A satellite receiver 206 is in communication with the satellite dish 204 to receive content signals 207, which may be analog or digital. A video encoder 208 may be used to encode received content signals 210 to produce encoded content signals 212. As understood in the art, the video encoder 208 may be utilized, if needed, to convert the received content signals 210, if in an analog format, into digital signals 212 and may encode the received content signals 210 to have a particular format and compression scheme. In general, conventional video on-demand server systems 202 are used to produce formats for standard televisions. Some newer video on-demand service systems 202 format video signals to be available for high-density television (HDTV).

A video on-demand server 102 is in communication with the video encoder 208 and configured to receive the digital signals 212 for storage by the video on-demand server 102. The content, represented as digital encoded content signals 212, are stored as video content files 214 on a storage unit (not shown) and within a database (not shown) for later access by a consumer for selection to play on his or her television 108. The middleware server 104 may be in communication with the video on-demand server 102 to enable a consumer using the remote control 110 to interact with the middleware server 104 via the set top box 106 and over the network 112 and access content stored on the video on-demand server 102. The middleware server 104 maybe configured to access the video content files 214 managed by the video on-demand server 102 to present titles and other information associated with the video content file 214 to the consumer for selection thereof.

As understood in the art, the set top box 106 supports the software capabilities for interacting with middleware or software executed by the middleware server 104. The set top box 106 enables the consumer to interact with the software on the set top box 106 and, in turn, the middleware executed by the middleware server 104 via the remote control 110. This software interaction enables the consumer to interact with an enhanced program guide (EPG) to view titles of content (e.g., movies, programs, sporting events, etc.) and other information about the content stored in the video content files 214. In addition, as understood in the art, the enhanced program guide enables consumers to change channels, make purchases, and perform other functions. In addition, the enhanced program guide managed by the middleware server 104 enables consumers to select video content files 214 that have prices associated for downloading and watching the content and bill the consumer for watching select content in accordance with the associated prices.

As described above, consumers are using many different devices for their entertainment. The configuration of conventional video on-demand server system 202 is limited to servicing consumers using televisions connected to set top boxes. Other service providers, such as telecommunications service providers, have developed other video on-demand server systems 202 in order to communicate content, such as television programs, delayed live-feeds of television stations (e.g., Fox news channel), and other video entertainment, to wireless devices. In these configurations, the video encoders are configured to format the video content for the particular devices (e.g., mobile telephones) that are being serviced in a similar manner and configuration as that shown in FIG. 2 to service televisions. Of course, each of these video on-demand service systems are expensive to install and manage.

SUMMARY

To overcome the expense for different service providers to install and managing video on-demand server systems, the principals of the present invention provide for a video on-demand server system configured to manage and serve multiple devices having different formats. By providing such a multiple device video on-demand service system, cost and equipment redundancy may be substantially reduced. In addition, consumers with multiple devices may access the same content in different formats from a single service provider that supports multiple devices that use different formats.

One embodiment includes a system for distributing content over multiple networks. The system may include a receiver configured to receive content from a content source. At least two encoders may be configured to encode the content in formats for play on devices having different formats. A metadata management unit may be configured to apply information associated with the content to the content in the form of metadata. A content management server may be in communication with the encoders and be configured to receive and store the content. A conditional access digital rights management server may be in communication with the content management server and be configured to authenticate a user attempting to access the content. A middleware server may be in communication with the content management server and be configured to manage a program guide accessible to users to view and select content to play on a device. Devices of different formats may be configured to access the content management server via at least one network and select content to play via the program guide. The content management server may be a video on-demand server. The encoders may include a television video encoder configured to encode the content in a format available to be played on television and a wireless device video encoder configured to encode the content in a format available to be played on a wireless device. In one embodiment, the wireless device is a mobile telephone. The encoders may encode the content using the same encoding scheme, such as H.264. In addition, at least one database may be managed by the content management server and be configured to store the same content in different formats. An input/output unit may be in communication with the network(s) and be configured to receive requests from users for content via the network(s) and communicate the encoded content via the network(s) to the users.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Figure 1:
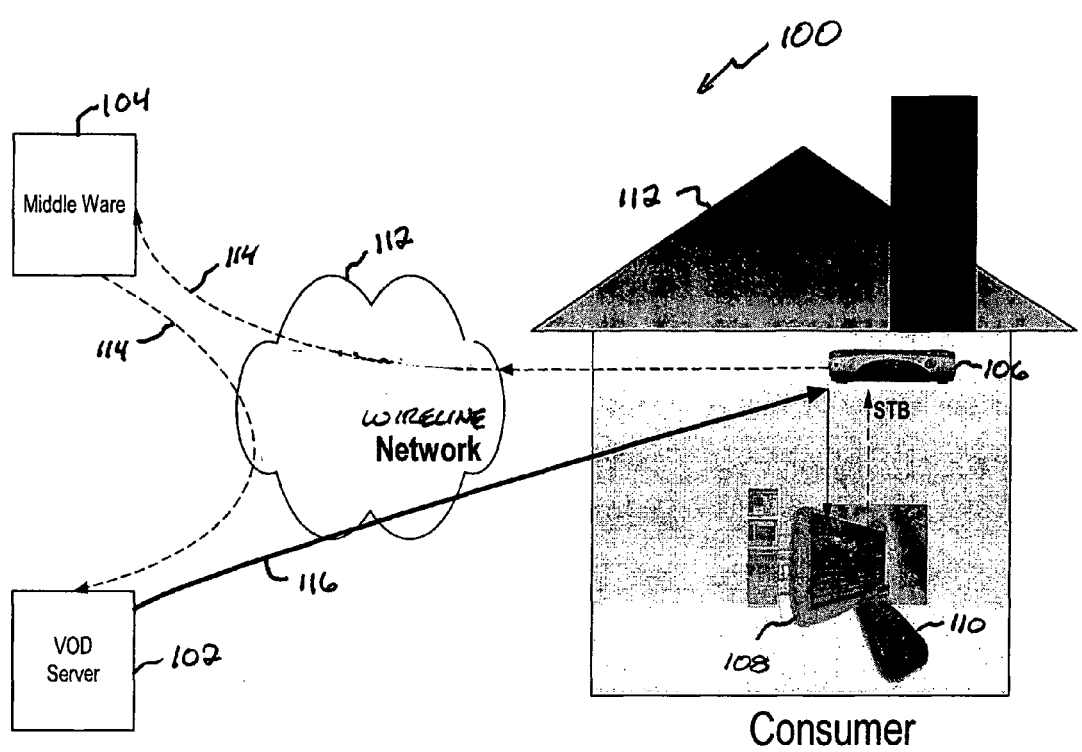
FIG. 1 is an illustration of an exemplary network for content to be accessed and communicated to consumers.
Figure 2:
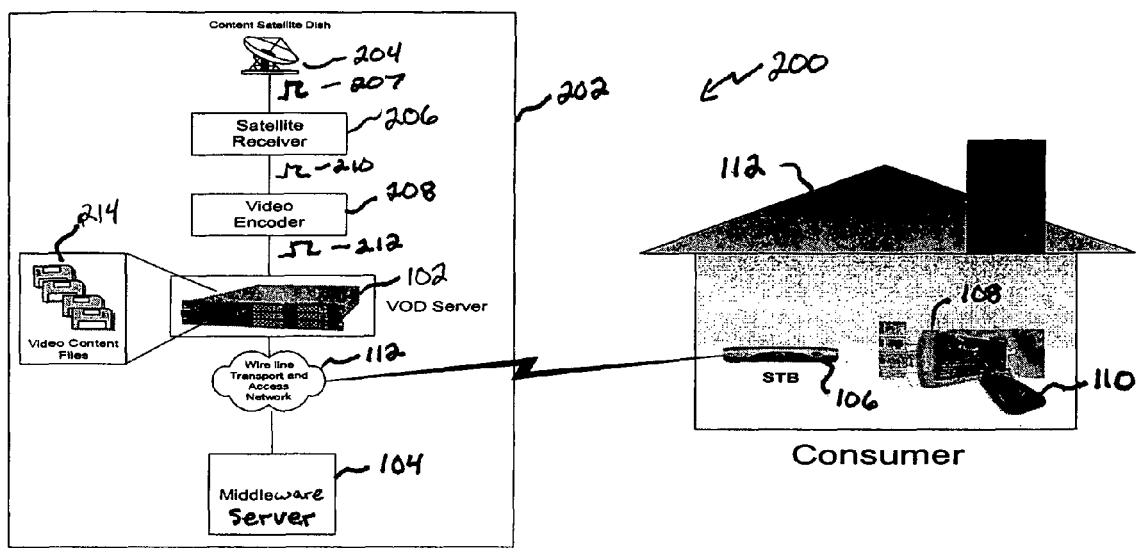
FIG. 2 is an illustration of a conventional video on-demand server system for providing video on-demand services to consumers.
Figure 3:
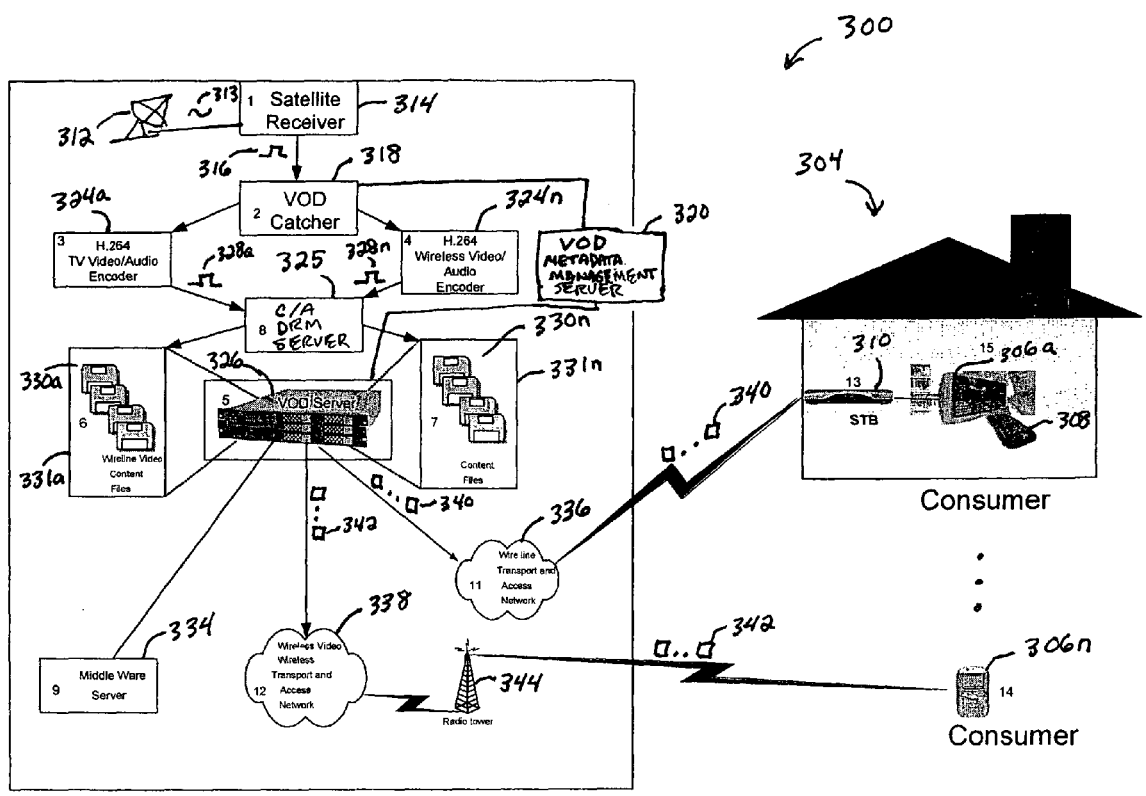
FIG. 3 is an illustration of an exemplary video on-demand server system for encoding, storing, managing, and distributing content to devices of different formats.

FIG. 3 is an illustration of an exemplary video on-demand server system for encoding, storing, managing, and distributing content to devices of different formats. A system 300 includes a video on-demand server system 302 and consumers 304. The consumers may use a number of different devices, including televisions, mobile phones, computers, etc., for viewing and interacting with entertainment. For example, consumers may interact with televisions 306a, wireless devices 306n, etc. (collectively 306) to access the video on-demand server system 302. In interacting with the television 306a, the consumer may use a remote control 308 to interact with a set top box 310 associated with the television 306a to communicate with the video on-demand server system 302. In either case (i.e., interacting with the television 306a or wireless device 306n), the consumer may communicate with the video on-demand service system 302 in order to access content stored thereon and download the content to the respective devices for interacting with and/or viewing the content.

The video on-demand server system 302 may include a satellite dish 312 for receiving content signals 313 from a satellite (not shown). A satellite receiver 314 may be in communication with the satellite dish 312 and receive the content signals 313. A satellite receiver 314 may process the content signal 313 and produce content signal 316 in an analog or digital format. The content signal 316 may be communicated to a video on-demand catcher 318, which is a storage device for storing the content in raw data files. The video on-demand catcher 318 may store the content in a database or otherwise and is used as a buffer prior to being encoded. A video on-demand metadata management computing device 320 may be in communication with the video on-demand catcher 318 for determining the content that is being downloaded to the video on-demand service system 302 and/or to apply information associated with the content files to the content files. The video on-demand metadata management computing device 320 may alternatively be software executed on another server, as provided in FIG. 3. The information associated with the content files may include titles, names or actors, length of time, cost, and any other attributes associated with the content files that may be communicated to consumers for determining what content is available for download to respective devices.

Two or more encoders 324a-324n (collectively 324) may be in communication with the video on-demand catcher 318. The encoders 324 may be configured to encode the content files stored by the video on-demand catcher 318 into respective formats. For example, encoder 324a is a television video encoder and encodes the content in a format that is capable of being viewed on a standard television. Encoder 324n is a wireless video encoder that encodes the content into a format available to be viewed by a wireless device, such as a mobile telephone. The formats that each of the respective encoders are capable of producing is dependent upon the type of devices that the service provider managing the video on-demand server system 302 desires to support for accessing and downloading the content. In other words, an encoder may be configured to format the content in any format desired for servicing consumers with devices of different formats. Video encoding codecs may include a certain number of lines of resolution on a consumer product, including size of memory associated with the device, compression standards, and any other video/audio codec parameters associated with devices for listening to and/or viewing content. For example, the compression technique maybe the H.264 or MPEG-4, part 10 compression technique. Other compression techniques may be utilized as understood in the art. Still yet, each format may use a different compression technique, but using the same compression technique for each format provides a cost effective solution.

One concern of producers and distributors of video content is how digital rights management is to be performed by service providers. In other words, a content owner is concerned about video content being pirated by individuals who do not pay for the content and who may, in addition to viewing the content without paying for it, redistribute the video content without financially accounting to the owners of the content. A service provider who is cognizant of such concerns may utilize a conditional access digital rights management (DRM) server 325. The conditional access digital rights management server 325 may include one or many servers that validate a subscriber prior to enabling the subscriber to access the content or even a programming guide to view the available content. Additionally, the CA/DRM server 325 may work in unison with the middleware server 334 to maintain a list of subscribers and their associated devices to ensure those subscribers are current on their subscription and determine that the subscriptions are, in fact, able to access certain types of content.

The conditional access digital rights management server 325 may receive encoded video signals 328a-328n (collectively 328) of the different formats as encoded by the respective encoders 324. The DRM server 325 adds security to the video content to allow communication of the video content to a video on demand (VOD) server 326. The video on-demand server 326 may store the video content into video content files 330a-330n (collectively 330) in one or more databases 331a-331n (collectively 331). The video on-demand server 326 may execute software (not shown) for storing and managing the video content 330 in the databases 331. In terms of managing the content files 330, the video on-demand server may manage a table that includes a list of programming (e.g., movies, television shows, video feeds, games, etc.) and the different types of formats that each content file is stored. In one embodiment, the content files 330 include live video feeds, such as news, that are buffered into content files for distribution.

A middleware server 334 maybe in communication with the conditional access digital rights management server 325 via the video on-demand server 326 and, as understood in the art, host middleware that provides a programing guide, such as an enhanced programming guide, that consumers may access to view content stored by the video on-demand server for access and download for display and/or interaction. The middleware hosted by the middleware server 334 receives customer information from the consumer to allow/disallow specific types of content. For example, a consumer, such as a child, may not have a subscription available to view certain types of content, such as violence or adult programing.

The video on-demand server 326 may further be in communication with one or more networks, such as a wireline network 336 (e.g., public switched telephone network (PSTN) and wireless network 338 (e.g., mobile telephone network). A consumer may access the content via the video on-demand server 326 over the wireline network 336 and receive content in the form of data packets 340 to the set top box 310 for display on the television 306a. In addition, a consumer using the wireless device 306n may access the video on-demand server 326 via the wireless network 338 to request content and receive the content in the form of data packets 342 communicated by a radio tower 344 to the wireless device 306n. Because the middleware server 334 is capable of providing access to all the consumers using different devices of different formats, the consumers, no matter which device he or she uses, may view a programming guide that is substantially the same on the different devices. Each device may include software and/or hardware configured to enable a user to interact with the programming guide. It should be understood that other middleware servers 334 may be utilized in accordance of the principles of the present invention for servicing certain types of devices having certain formats. However, to save costs and provide for simplification of the video on-demand service system 302, a single middleware server may be utilized for servicing devices of different formats.

Figure 4:
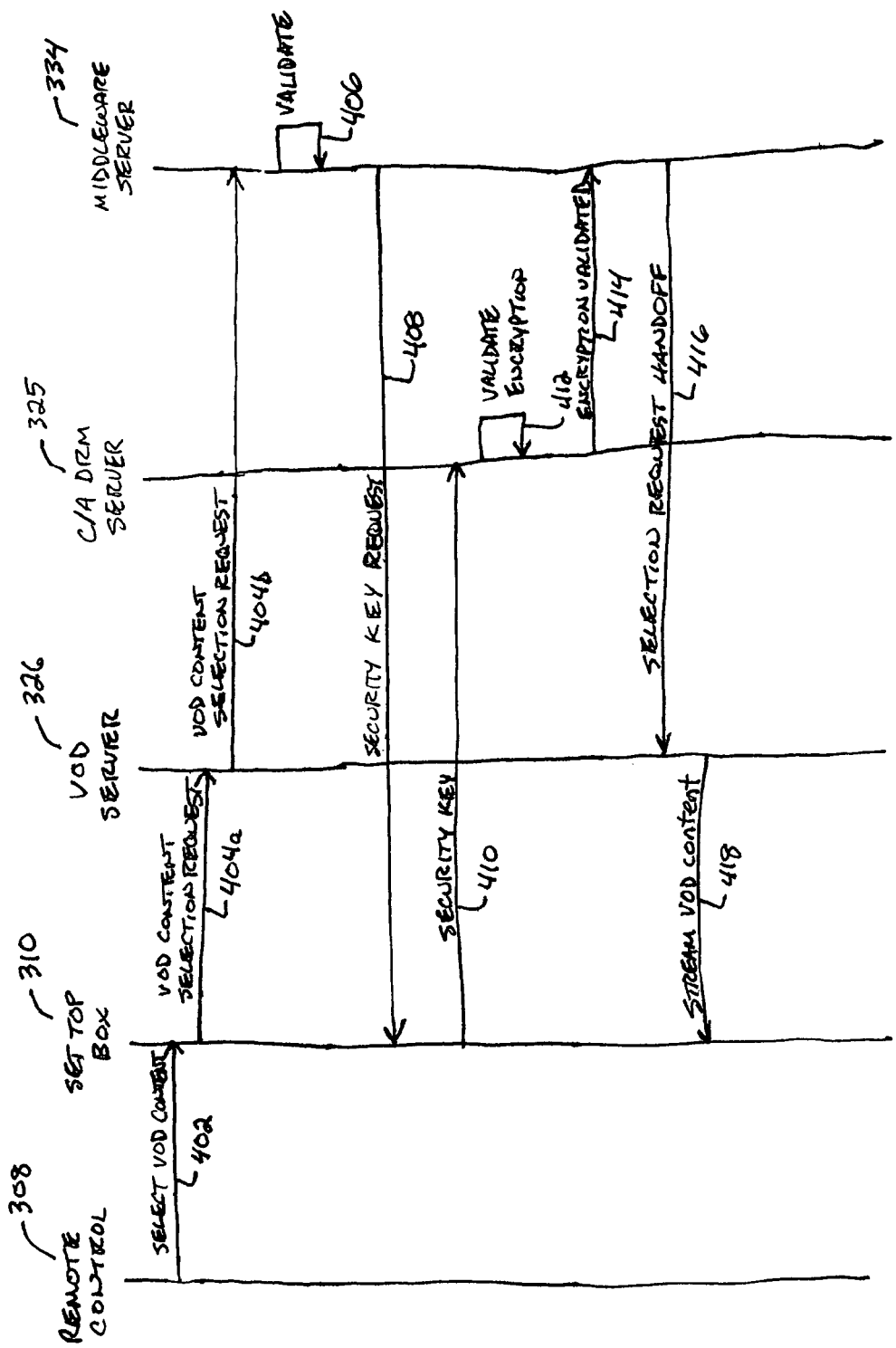
FIG. 4 is a timing diagram of an exemplary process for managing content stored by the video on-demand storage system of FIG. 3.

FIG. 4 is a timing diagram of an exemplary process for managing content stored by the video on-demand storage system of FIG. 3. At step 402, a wireline customer (e.g., a customer who accesses video on demand content via a set top box) may use the remote control 308 to select a video on demand content channel via the set top box 310 that is configured to display an enhanced program guide menu. The video on demand content channel may include a variety of different movie types, such as comedy, classic, drama, and so forth. In addition, the content channel may provide the customer with movies arranged by movie stars, movie titles, television program, and so forth, as understood in the art. The customer or consumer may select content to be played on his or her television connected to the set top box 310. In response to the user selecting a specific piece of content (e.g., movie), the set top box 310 may deliver a VOD content selection request via the wireline transport and access network 336 (FIG. 3) to the VOD server 326 at step 404a, which, in turn, communicates the request at step 404b to terminate at the middleware server 334. At step 406, the middleware server 334 may validate the customer if he or she is authentic based on identification of the customer set top box 310 being received with the VOD content selection request. The identification may include an identifier in the form of a MAC address or IP address assigned by a service provider to that particular customer.

In response to the middleware server 334 validating the customer at step 406, a security key request follows the consumer set top box 310 at step 408. Since each piece of content is pre-encoded and pre-loaded with an encryption label prior to being stored on the VOD server 326, the security key or other validation identifier associated with the set top box 310 is determined before video/audio streaming is allowed. The encryption process of validation is determined at step 412 by the conditional access digital rights management server 325 by determining if the encryption is a complete match. If an encryption match is determined at step 412, the conditional access digital rights management server 325 notifies the middleware server 334 of the validation at step 414. The middleware server 334 may hand off the user's selection request to the VOD server 326 at step 416 and the VOD server 326 may begin streaming the requested video content to the set top box 310 at step 418. As content is streaming, the encryption mechanism may continue for the length of the streaming time or until the customer terminates the services.

A customer may have more than one user profile within a home. For example, multiple user profiles may be used to prevent children from watching adult content, for example, or otherwise. In such a case, parents may set a child's profile to block all but cartoon or G-rated movies for the child to watch. In this case, in response to the child logging into his or her profile, the authentication process uses a different security key for the digital rights management server 326 to validate.

If the customer is using a wireless device 306n (FIG. 3), the call flow is similar with the exception of the wireless device being the communication device to the network (i.e., there is no remote control or set top box). The wireless device is to be compatible with the software being executed on the conditional access digital rights management server 326. Additionally, different pieces of content requested by the wireless user is to be recognized and managed by the VOD server 326 so the wireless device can display the content on a smaller screen.

Figure 5:
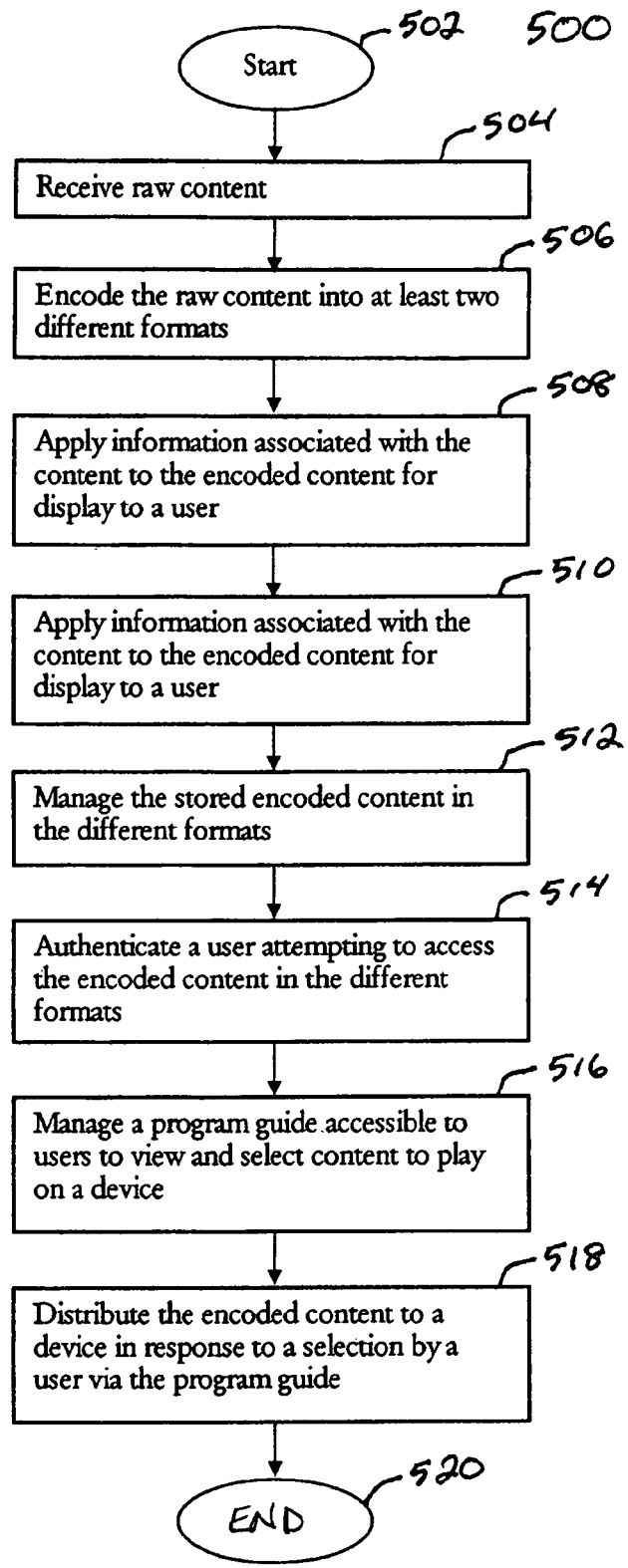
FIG. 5 is a flow chart of an exemplary process for managing and distributing content in accordance with the principles of the present invention.

FIG. 5 is a flow chart of an exemplary process 500 for managing and distributing content in accordance with the principles of the present invention. The process 500 starts at step 502. Step 504, raw content is received. The raw content is encoded into at least two different formats at step 506. At step 508, information associated with the content is applied to the encoded content for display to a user. The information may be applied to the content in the form of metadata and may include title, names of actors, and other information associated with the content. At step 510 the encoded content in the different formats is stored.

The stored encoded content in the different formats is managed at step 512. At step 514, a user attempting to access the encoded content in the different formats is authenticated. The authentication may determine that a particular device has access rights to the content. In one embodiment, the authentication may determine the specific content to which the user has rights to access using a certain device. At step 516, a program guide accessible to users to view and select content to play on a device is managed. The program guide may be managed by updating content available for selection, managing channels, and other management aspects of a program guide. At step 518, the encoded content maybe distributed to a device in response to a selection by a user via the program guide. The process 500 ends at step 520.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A system for distributing content over multiple networks, said system comprising:
    a receiver, located on a content provider network, configured to receive content from a content source, wherein the content provider network excludes customer premises equipment;
    a plurality of content-provider encoders located on the content provider network, at least two of the content-provider encoders configured to encode the content into at least two different formats for play on devices having different formats;
    a metadata management unit located on the content provider network configured to apply information associated with the content to the content in the form of metadata;
    a content management server located on the content provider network, in communication with said plurality of encoders and configured to receive and store the content, the content management server configured to receive a content selection request from a user device and communicate the content selection request to a middleware server and in response to receiving a verified content selection request from the middleware server, transmitting an encoded content associated with the content selection request to the user device, the encoded content format being selected based on a type of device associated with the user device;
    a conditional access digital rights management server located on the content provider network in communication with said content management server and configured to authenticate a user from among multiple customers of a communications service provider attempting to access the content, the conditional access digital rights management server configured to receive a security key associated with a user profile from the user device and determine if the security key is capable of decrypting a content associated with the content selection request, and notify the middleware server if the security key is capable of decrypting a content associated with the content selection request;
    the middleware server located on the content provider network in communication with said content management server and configured to manage a program guide accessible to users to view and select content to play on a device, the middleware server configured to receive the content selection request from the content management server and authenticate the user device based on an identifier associated with the user device that is received with the content selection request and responsive to authenticating the user device and receiving a notification from the conditional access digital rights management server that the security key associated with the user profile is capable of decrypting a content associated with the content selection request, communicating the verified content selection request back to the content management server; and
    a plurality of devices configured for different formats and configured to access the content management server via at least one network and select content to play via the program guide.

2. The system according to claim 1, wherein the content management server is a video on-demand server and the content is stored programming available for selection by the user.

3. The system according to claim 1, wherein the encoders includes (i) A television video encoder configured to encode the content in a format available to be played on a television and (ii) A wireless device video encoder configured to encode the content in a format available to be played on a wireless device.

4. The system according to claim 3, wherein the wireless device is a mobile telephone.

5. The system according to claim 1, wherein the encoders further compress the content using a compression technique.

6. The system according to claim 5, wherein the compression technique is H.264.

7. The system according to claim 1, wherein the devices include a television associated with a set top box.

8. The system according to claim 1, further comprising at least one database managed by said content management server, said at least one database configured to store the same content in different formats.

9. The system according to claim 1, further comprising an input/output unit in communication with at least one network and configured to receive requests from users for content via the at least one network and communicate the encoded content via the at least one network to the users.

10. A method for distributing content, said method comprising:
    receiving raw content from a content producer, with a receiver, located on a content provider network, configured to receive content from a content source, wherein the content provider network excludes customer premises equipment;
    encoding the raw content into at least two different formats for play on devices having different respective formats with a plurality of content-provider encoders located on the content provider network, at least two of the content-provider encoders configured to encode the content into at least two different formats for play on devices having different formats;
    applying information associated with the content to the encoded content for display to a user with a metadata management unit located on the content provider network configured to apply information associated with the content to the content in the form of metadata;
    storing the encoded content in the different formats on a content management server located on the content provider network, in communication with said plurality of encoders and configured to receive and store the content, the content management server configured to receive a content selection request from a user device and communicate the content selection request to a middleware server and in response to receiving a verified content selection request from the middleware server, transmitting an encoded content associated with the content selection request to the user device, the encoded content format being selected based on a type of device associated with the user device;

authenticating a user from among multiple customers of a communications service provider attempting to access the encoded content in the different formats with a conditional access digital rights management server located on the content provider network in communication with said content management server and configured to authenticate the user from among multiple customers of a communications service provider attempting to access the content;

determining, with the conditional access digital rights management server if a security key associated with a user profile received from a user device is capable of decrypting an encoded content associated with the content selection request;

notifying the middleware server if the security key is capable of decrypting a content associated with the content selection request;

managing a program guide accessible to users to view and select content to play on a device with the middleware server, the middleware server being configured to receive the content selection request from the content management server and authenticate the user device based on an identifier associated with the user device that is received with the content selection request and responsive to authenticating the user device and receiving a notification from the conditional access digital rights management server that the security key associated with the user profile is capable of decrypting a content associated with the content selection request;

communicating the verified content selection request back to the content management server; and distributing, by the content provider system, the encoded content to a plurality of devices configured for different formats and configured to access the content management server via at least one network and select content to play via the program guide.

11. The method according to claim 10, wherein storing the encoding content includes storing movies available by selection by the user.

12. The method according to claim 10, wherein encoding includes encoding the raw content into a format available to be played on a television and in a format available to be played on a wireless device.

13. The method according to claim 12, wherein encoding includes encoding the raw content into a raw format to be played on a mobile telephone.

14. The method according to claim 10, further comprising compressing the encoded content in different formats using a compression technique.

15. The method according to claim 14, wherein compressing includes compressing using the H.264 compression technique.

16. The method according to claim 10, wherein distributing includes distributing the encoded content to a set top box associated with a television.

17. The method according to claim 10, wherein storing includes storing the encoded content in at least one database configured to store the same content in different formats.

18. The method according to claim 10, further comprising receiving a request from users for content via at least one network and distributing the encoded content via the at least one network to the users.

* * * * *